US012683305B2

(12) United States Patent
Terashima et al.

(10) Patent No.: US 12,683,305 B2
(45) Date of Patent: Jul. 14, 2026

(54) GROUNDING RESISTANCE REDUCING MATERIAL AND GROUNDING DEVICE

(71) Applicant: SANKOSHA CORPORATION, Tokyo (JP)

(72) Inventors: Koji Terashima, Tokyo (JP); Kenta Kobayashi, Tokyo (JP); Shuji Kurano, Tokyo (JP)

(73) Assignee: SANKOSHA CORPORATION, Tokyo (JP)

( * ) Notice: Subject to any disclaimer, the term of this patent is extended or adjusted under 35 U.S.C. 154(b) by 203 days.

(21) Appl. No.: 18/609,444

(22) Filed: Mar. 19, 2024

(65) Prior Publication Data

US 2025/0118909 A1 Apr. 10, 2025

(30) Foreign Application Priority Data

Oct. 10, 2023 (JP) ................................ 2023-175608

(51) Int. Cl.
*H01R 4/00* (2006.01)
*H01R 4/66* (2006.01)
*H01B 1/06* (2006.01)

(52) U.S. Cl.
CPC ................ *H01R 4/66* (2013.01); *H01B 1/06* (2013.01)

(58) Field of Classification Search
CPC ................................... H01R 4/66; H01B 1/06
See application file for complete search history.

(56) References Cited

U.S. PATENT DOCUMENTS

2016/0126645 A1* 5/2016 Mundle .................... H01R 4/66 174/6
2019/0051996 A1* 2/2019 Cochrane .............. E04H 17/161
2020/0383194 A1* 12/2020 Stilwell .................... H02G 9/02

FOREIGN PATENT DOCUMENTS

JP 61-165975 A 7/1986
JP S61165975 A * 7/1986
JP H03-265556 A 11/1991
JP 2007-103185 A 4/2007

OTHER PUBLICATIONS

JP 2007103185; English translation (Year: 2007).*
Office Action dated Jul. 15, 2025, issued in counterpart JP Application No. 2023-175608, with English translation.(10 pages).
Office Action dated Dec. 2, 2025, issued in counterpart JP Application No. 2023-175608, with English translation. 1 (12 pages).

* cited by examiner

*Primary Examiner* — Pete T Lee
(74) *Attorney, Agent, or Firm* — WHDA, LLP

(57) ABSTRACT

Providing a grounding resistance reducing material that can contribute to the reduction in carbon dioxide emission and can be used in the same manner as the grounding resistance reducing material that uses coke, which is fossil fuel, and a grounding device using the grounding resistance reducing material, and also providing a grounding resistance reducing material whose weight can be trimmed. A grounding resistance reducing material 14 to be laid between a grounding electrode 11 buried in soil 12 and the soil 12 contains carbide granules obtained by incomplete combustion of biomass.

9 Claims, 9 Drawing Sheets

GROUNDING RESISTANCE REDUCING MATERIAL AND GROUNDING DEVICE

TECHNICAL FIELD

The present invention relates to a grounding resistance reducing material and a grounding device that uses the same.

BACKGROUND ART

As a method of reducing grounding resistance when burying a grounding electrode such as a bare copper wire, a technique of placing a grounding resistance reducing material between the grounding electrode and the ground to reduce the grounding resistance is known. For example, Patent Literature 1 proposes a method of spraying a grounding resistance reducing material, which is a mixture of carbon granule such as coke generated from coal or petroleum, as an electrically conductive material and powder cement as an alkaline consolidating material, into a groove on the ground and then burying a grounding electrode into the groove.

CITATION LIST

Patent Literature

Patent Literature 1: JP 1986-165975A

SUMMARY OF INVENTION

Problem to be Solved by the Invention

However, since the coke powder, etc. used as the grounding resistance reducing material is generated from fossil fuel, large amounts of carbon dioxide are generated during the manufacturing process, inhibiting carbon neutral from being achieved. In addition, since the price of coke powder has skyrocketed recently, an alternative material is desired. Also, since the conventional grounding resistance reducing material is heavy, it is desired to trim the weight of the material so as to reduce the load of transporting the grounding resistance reducing material by manpower in the burying work performed in mountain areas, etc. where transport vehicles cannot be used.

One of the objectives of the present invention is to provide a grounding resistance reducing material that can contribute to the reduction of carbon dioxide emission and yet can be used in the same manner as the grounding resistance reducing material that uses coke, which is fossil fuel, and the other objective is to trim the weight of such grounding resistance reducing material.

Means for Solving the Problem

To solve the above problem, the present invention provides a grounding resistance reducing material to be laid down between a grounding electrode buried in soil and the soil. This grounding resistance reducing material is characterized in that carbide granules obtained by incomplete combustion of biomass are contained.

According to the present invention, since the carbide granules are obtained by incomplete combustion of biomass, the amount of carbon dioxide emitted during the manufacturing process can be made smaller compared to coke of fossil fuel. Also, since the biomass is charred and then buried in the soil, the decay and decomposition can be prevented, and thus the material can stay in the soil stably for a long time, which contributes to the reduction in carbon dioxide emission over a long period. Furthermore, even if biomass-derived carbide granules are used, the specific resistance as the grounding resistance reducing material can be suppressed as low as that of the material using coke of fossil fuel. The sufficient grounding resistance reducing effect can thus be obtained.

Therefore, the present invention can contribute to the reduction in carbon dioxide emission for a long time, and at the same time, can provide a grounding resistance reducing material that can be used in the same manner as the grounding resistance reducing material using coke.

It is preferable that the specific resistance of the carbide granules is 430 Ω·cm or lower to suppress the specific resistance, thereby easily securing the effect of reducing the grounding resistance.

With the grounding resistance reducing material according to the present invention, it is also preferable that the bulk specific gravity of the carbide granules is 0.40 $g/cm^3$ or lower.

Since the bulk specific gravity of the carbide granules obtained by incomplete combustion of biomass is smaller than that of coke of fossil fuel, the weight of the grounding resistance reducing material can be trimmed, which facilitates transportation and handling before construction, and during construction, saves work and facilitates burying and fastening of the grounding electrode, suppressing construction labor.

With the grounding resistance reducing material according to the present invention, it is preferable that the mass fraction of moisture contained in the carbide granules is 7.5% by weight or lower.

That makes it possible to suppress the progress in hardening of hydraulic component before using the grounding resistance reducing material. Also, with the carbide granules that have high mass fraction, lumps tend to be formulated when the grounding resistance reducing material is kneaded with water. However, by making the mass fraction of moisture fall within the range shown above, the kneading work is facilitated.

With the grounding resistance reducing material according to the present invention, it is preferable that the above-mentioned carbide granules and the hydraulic powder are contained in a mixed state, and that the grounding electrode is integrated as hardening progresses.

In this way, as the hardening progresses, the carbide granules can be retained at a specified position and the grounding electrode can be integrated into the grounding resistance reducing material, increasing the area of the grounding electrode that contacts the soil and thus improving the effect of reducing the grounding resistance.

In that case, it is preferable that the carbide granules and the hydraulic powder are mixed in the ratio by weight of 10:90 to 50:50.

By mixing the carbide granules and the hydraulic powder at the above mixing ratio to make a grounding resistance reducing material, the sufficient strength of the grounding resistance reducing material can be assured when they become hardened in the soil, and at the same time, the desirable effect of reducing grounding resistance can be ensured. Also, since the state where the grounding electrode is embedded, integrated, and hardened in the grounding resistance reducing material can be maintained easily, the effect of reducing the grounding resistance can be improved.

The grounding device according to the present invention includes the above-mentioned grounding resistance reducing material to be embedded and hardened in the soil, and integrates a grounding electrode into the grounding resistance reducing material.

Effects of Invention

The present invention can contribute to the reduction in carbon dioxide emission, and at the same time, can provide a grounding resistance reducing material that has the similar performance as the grounding resistance reducing material using coke of fossil fuel, and a grounding device that uses the grounding resistance reducing material.

EMBODIMENTS OF THE INVENTION

Figure 1:
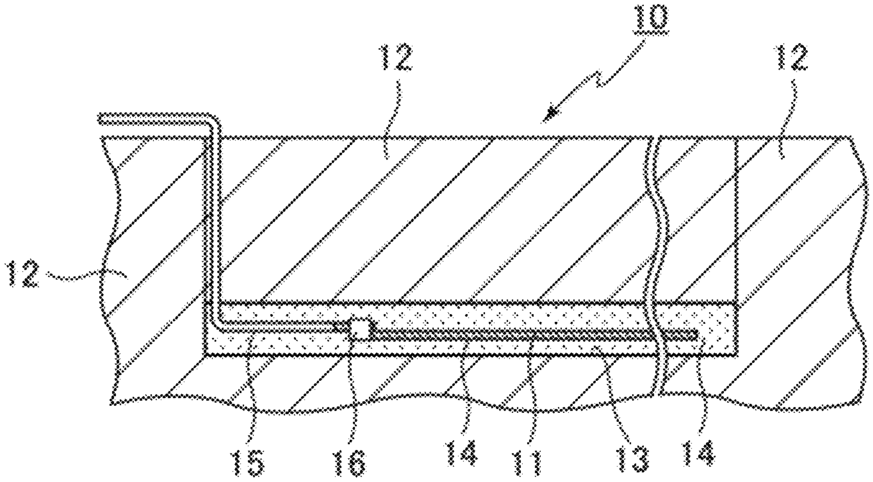
FIG. 1 is a vertical cross-sectional view showing a grounding device formed by using a grounding resistance reducing material according to an embodiment of the present invention.

The embodiment of the present invention will hereinafter be described in detail by referring to drawings.

The grounding resistance reducing material according to the embodiment is placed between a grounding electrode and soil when burying grounding electrodes of various electrical facilities, lightning arresting systems, etc. to reduce the grounding resistance. In this embodiment, the grounding electrode is embedded in the grounding resistance reducing material, and in that state, fastened to and integrated into the material.

This grounding resistance reducing material contains carbide granules obtained by incomplete combustion of biomass and hydraulic powder in a mixed state.

When the material is buried in the soil, it may be in a state of powder or slurry mixed with an aqueous liquid, provided that the material hardens over time after burial in the soil.

The carbide granules are generated in advance by incomplete combustion of biomass. It was found, however, that various properties vary depending on the biomass used as a raw material. The inventors, et. al studied the degree of electrical conductivity, particle diameter, etc. using various types of biomass, and found as described in this embodiment that using carbide granules made from woody biomass such as cedar and cypress would provide favorable results.

It is only necessary that the incomplete combustion to produce carbide granules is heat treatment where at least a part of biomass can be carbonated. For example, the incomplete combustion can be made to occur by heating the biomass while the amount of supplied oxygen is regulated as required.

It is preferable that as such carbide granules, those having the resistivity of 430 Ω·cm or lower are used; if the resistivity of the carbide granules is excessively high, sufficient grounding resistivity reducing effect cannot be obtained. The resistivity of the carbide granules can be measured by the four-electrodes method, for example, with the carbide granules being made to absorb water.

It is preferable that the resistivity of this carbide granules becomes 100 Ω·cm or lower in a state mixed with hydraulic powder. The carbide granules may be charcoal, bamboo charcoal, and biochar powder materials derived from rice husk or from livestock feces, provided that the resistivity remains at 100 Ω·cm or lower in a state mixed with the hydraulic powder.

The carbide granules having a grain diameter that falls within the range from 0.291 μm to 998 μm (16 mesh pass or less) can be used. The grain diameter can be measured by the sieve classification method, the laser diffraction method, etc.; a laser diffraction measuring apparatus such as SALD-3100 manufactured by Shimadzu Corporation may be used, for example.

Since such carbide granules have high affinity for water, they are less prone to unevenness when mixed with the hydraulic powder with water added.

It is also desirable that the bulk specific gravity of the carbide granules be 0.40 g/cm$^3$ or lower.

If the specific gravity of the carbide granules is as low as above, the weight of the grounding resistance reducing material can be trimmed drastically, compared to coke of fossil fuel, facilitating handling and construction. Moreover, provided that sufficient volume of the grounding resistance reducing material is ensured, the contact area with the soil can be secured in a state hardened in the soil, making it possible to obtain the sufficient grounding resistance reducing effect.

It is also desirable that the mass fraction of the moisture contained in the carbide granules be 7.5% by weight or lower. The mass fraction of moisture contained in the carbide granules can be measured by a measuring method conforming to JIS M8812: 2004, for example.

If the mass fraction of the contained moisture falls within that range, it is possible to suppress progress of hardening of hydraulic component due to the moisture contained in the carbide granules before using the grounding resistance reducing material.

Also, with the carbide granules having a high mass fraction of moisture, lumps tend to be formulated when the grounding resistance reducing material is mixed with water before it is embedded in soil in a state of slurry. By keeping the mass fraction of moisture to 7.5% by weight or lower, generation of lumps can be suppressed, thus facilitating mixing work.

Meanwhile, the hydraulic powder is hardened over time by being added with water and mixed, or by being supplied with ambient moisture in the soil. The hydraulic powder hardens in a state mixed with the carbide granules, thereby fastening the carbide granules and the buried grounding electrodes at a certain position in the soil. Here, the carbide granules meet at least one of the following conditions as described above: the specific resistance of the carbide granules is 430 Ω·cm or lower, the bulk specific gravity of the carbide granules is 0.40 g/cm$^3$ or lower, and the mass fraction of moisture content in the carbide granules is 7.5% by weight or lower. More preferably, the carbide granules satisfy two or more of the above conditions of the specific resistance, the bulk specific gravity and the mass fraction of moisture content. Furthermore, it is preferable that the carbide granules satisfy all of the above conditions of the specific resistance, the bulk specific gravity and the mass fraction of moisture content.

As the hydraulic powder, any materials can be used as required, provided that they become hardened by being mixed with water. Various cements such as Portland cement, a mixed cement of blast furnace cement and fly ash cement, and various cements such as eco-cement can be used.

The grounding resistance reducing material is granules that contain such carbide granules and hydraulic powder in a mixed state. Here, the carbide granules meet at least one of the following conditions as described above: the specific resistance, the bulk specific gravity, and the mass fraction of moisture content. More preferably, the carbide granules satisfy two or more of the above conditions of the specific resistance, the bulk specific gravity and the mass fraction of moisture content. Furthermore, it is preferable that the carbide granules satisfy all of the above conditions of the specific resistance, the bulk specific gravity and the mass fraction of moisture content. Other materials such as bentonite and mineral salt may be contained, for example.

The mixing ratio between the carbide granules and the hydraulic powder may be 10:90 to 50:50 by weight.

If the ratio of the carbide granules increases, the effect of reducing grounding resistance increases. However, since the ratio of the hydraulic powder to the carbide granules decreases, the strength of the hardened grounding resistance reducing material may become insufficient when buried in the soil and hardened. The strength to bury the grounding electrode in the grounding resistance reducing material, and integrally fasten and retain them may also become insufficient. In that case, cracks or damage may occur after hardening, or a gap may be formed between the grounding electrode and the grounding resistance reducing material, thus allowing ingress of the moisture in the soil and causing corrosion of the grounding electrode. On the other hand, if the ratio of the hydraulic powder is increased, the strength increases. However, since the specific resistance tends to increase due to increased ratio of the hydraulic powder to the carbide granules, it may become difficult to obtain desired grounding resistance reducing effect.

Figure 2:
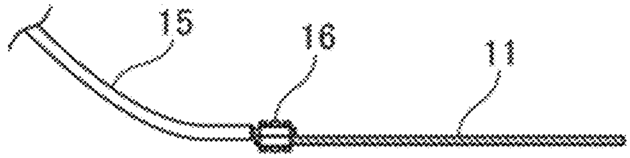
FIG. 2 is a drawing describing a grounding electrode of the grounding device according to the embodiment of the present invention.
Figure 3:
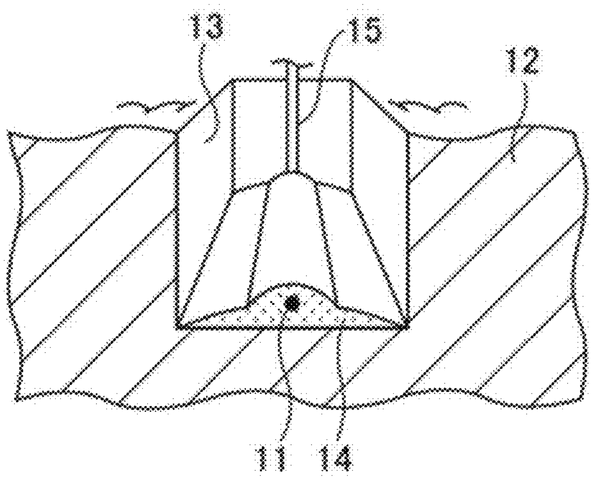
FIG. 3 is a drawing describing a method of creating the grounding device according to the embodiment of the present invention.

A grounding device in this embodiment using such a grounding resistance reducing material will then be described by referring to FIG. 1 to FIG. 3.

The grounding device 10 is used to bury a grounding electrode 11 connected to a body to be grounded in the soil 12. As shown in FIG. 1, with this grounding device 10, the grounding electrode 11 is placed along a groove-shaped concave portion 13 provided in the soil 12, and the grounding resistance reducing material 14 is laid within the concave portion 13 with the grounding electrode 11 buried in the material, meaning that this grounding resistance reducing material 14 is buried in the soil 12'.

A coated wire 15 connected to an electrical system, a lightning protection system, etc. (not shown) extends from the grounding device 10, with the grounding electrode 11 connected to the tip of the coated wire 15. As shown in FIG. 2, the grounding electrode 11 is made of a bare twisted copper wire, etc., which is connected to the coated wire 15 with a connection fitting 16, and the entire length of the bare twisted copper wire is embedded in the grounding resistance reducing material 14.

The grounding resistance reducing material 14 becomes hardened in the soil 12 over time by the effect of mixed hydraulic powder. When completely hardened, the grounding resistance reducing material becomes an uninterrupted belt-like hardened material, integrally fastening the grounding electrode 11 to the soil 12.

To manufacture such a grounding device 10, as shown in FIG. 3, the soil 12 is excavated to form a concave portion 13, the grounding electrode 11 connected to the coated wire 15 is placed along the concave portion 13, and the grounding resistance reducing material 14 is laid in the concave portion 13 so as to bury the grounding electrode 11 in it. At that time, the grounding resistance reducing material 14 may be laid in the concave portion 13 in a state of powdery particles, or in a state of slurry kneaded with water in advance.

The grounding device can be produced by then backfilling the concave portion with the soil 12', treading it, and adding the soil 12', thus completely backfilling the groove-shaped concave portion 13. The grounding resistance reducing material 14 hardens thoroughly over time, and thus the grounding device 10 is completed.

According to the grounding device 10 of the present invention, the electricity from the grounding electrode 11 flows into the soil 12 through the grounding resistance reducing material 14. Since the grounding resistance reducing material 14 having a small specific resistance is arranged in a hardened state so as to surround the grounding electrode 11, and a large surface of this grounding resistance reducing material 14 contacts the soil, the sufficient grounding resistance reducing effect can be obtained.

According to the grounding resistance reducing material 14 and the grounding device 10 in the embodiment described above, the carbon dioxide emission in the manufacturing process can be suppressed to lower than that of coke of fossil fuel, because carbide granules can be obtained by incomplete combustion of biomass. Also, since the biomass is carbonized and then laid in the soil 12, decay and decomposition can be prevented, and thus the material can stay in the soil 12 stably for a long time, which contributes to the reduction in carbon dioxide emission and the achievement of carbon neutral for a long time. Furthermore, although biomass-derived carbide granules are used, the specific resistance as the grounding resistance reducing material 14 can be made as low as that of coke of fossil fuel, and so the sufficient grounding resistance reducing effect can be ensured.

With this embodiment, the grounding resistance reducing material 14 is contained in a state mixed with the carbide granules, and as the material hardens, the grounding electrode 11 can be integrated into the grounding resistance reducing material 14. Therefore, the carbide granules can be retained at a given position, and at the same time, the integration between the grounding electrode 11 and the grounding resistance reducing material 14 increases the contact area with the soil 12, thereby improving the grounding resistance reducing effect.

Also, since the specific gravity of the carbide granules obtained by incomplete combustion of biomass is much smaller than that of coke of fossil fuel, the weight of the grounding resistance reducing material 14 can be trimmed. Therefore, the material can be transported easily before construction, its handling is easy, less labor is required for construction, and the grounding electrode can be buried and fastened easily, thus drastically saving trouble in construction.

The above-mentioned embodiment can be modified as required within the scope of the present invention.

Figure 4:
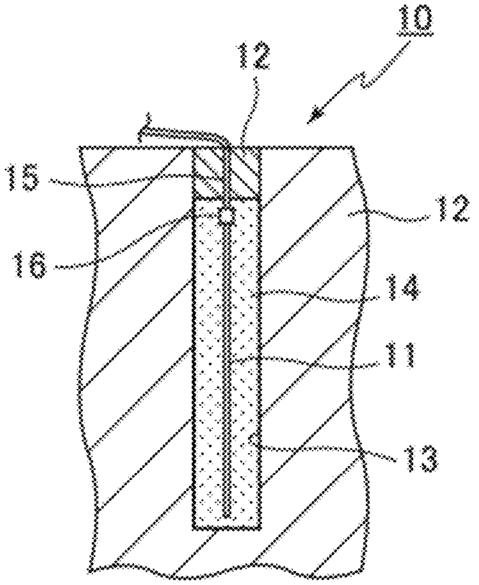
FIG. 4 is a vertical cross-sectional view showing a grounding device according to a modification of the embodiment of the present invention.

In the above-mentioned embodiment, the groove-like concave portion 13 is provided in the soil 12 in horizontal direction, the grounding resistance reducing material 14 is laid along the groove-like concave portion 13, and the grounding electrode 11 is buried in the material. However, as shown in FIG. 4, a vertical hole may be created by providing the concave portion 13 vertically. In that case, it is also possible that the concave portion 13 in the shape of a vertical hole may be filled with the grounding resistance reducing material 14 kneaded with water in advance to be in a state of slurry, into which the grounding electrode 11 may be buried so as to be integrated as the hardening progresses.

Figure 5:
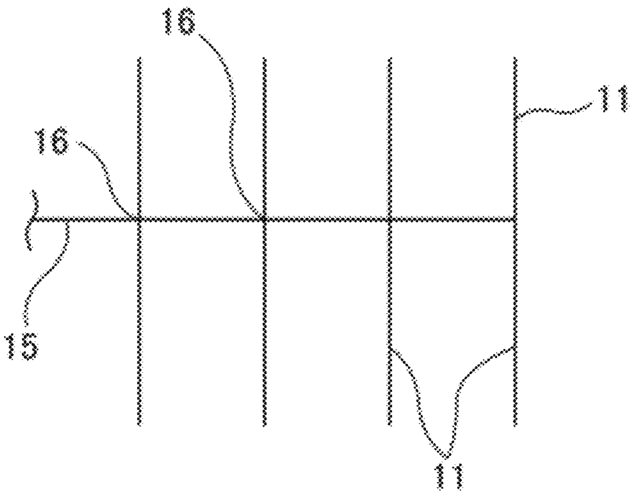
FIG. 5 is a drawing describing a layout of a grounding electrode according to another modification of the embodiment of the present invention.

With the grounding device 10 described above, a case where one grounding electrode 11 was buried in the soil 12 was described. However, the quantity of the grounding electrode 11 is not limited. For example, as shown in FIG. 5, it is also possible to bury a grounding electrode 11 that has multiple branches to reduce grounding resistance.

Figure 6:
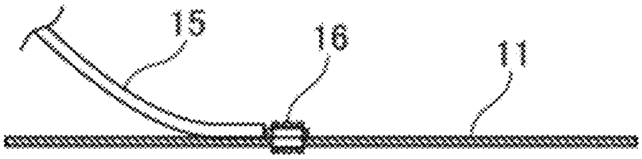
FIG. 6 is a drawing describing a grounding electrode of the grounding device according to another embodiment of the present invention.

In that case, as shown in FIG. 6, it is possible to connect the multiple branches of the grounding electrode 11 in parallel by connecting the bare twisted copper wire as the grounding electrode 11 and the coated wire 15 at the intermediate position of the bare twisted copper wire using a connection fitting 16, bury each in the grounding resistance reducing material 14, and place them in the soil 12.

Furthermore, although the case where the bare twisted copper wire was used as the grounding electrode 11 was described above, the material and shape of the grounding electrode 11 are not limited, provided that it is a conductive material resistant to corrosion even when buried in the soil 12 and the grounding resistance reducing material 14.

In the above embodiment, the case where the carbide granules and the hydraulic powder are mixed in the specified mixed state was described. However, the embodiments are not limited to the above only.

EXAMPLES

The invention will hereafter be described further in detail based on Examples.

Example 1

(Manufacturing a Grounding Resistance Reducing Material)

Carbide granules made from biochar A (made from woodchips of cedar, cypress, etc.) and the cement were mixed to produce grounding resistance reducing material 14.

Figure 7:
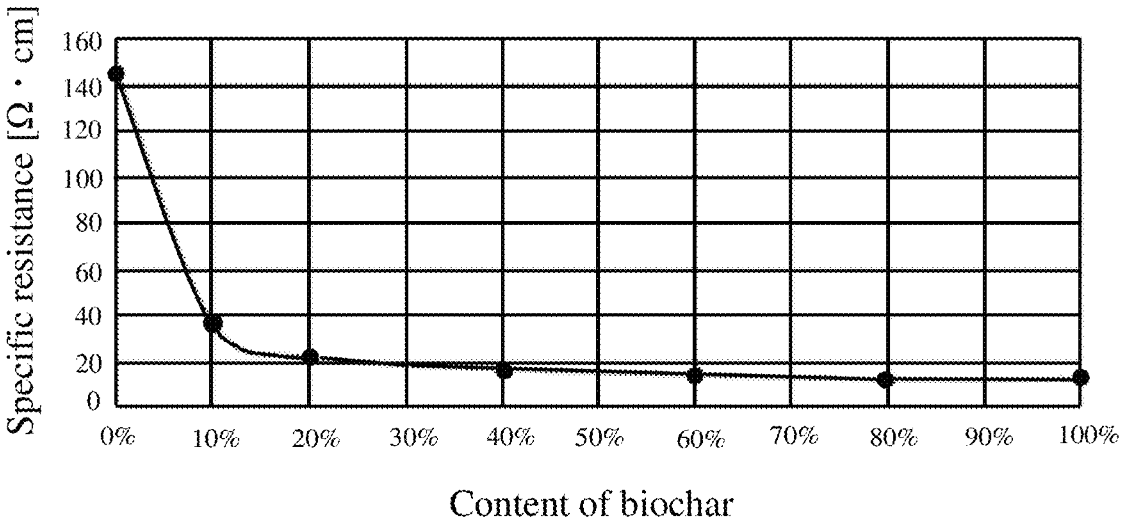
FIG. 7 is a chart showing the variation in resistivity with respect to the mixing ratio between carbide granules and cement in Example 1.

The change in specific resistance with respect to the mixing ratio between the carbide granules and the cement was measured. As shown in FIG. 7, the specific resistance was found to become smaller than 100 Ω·cm when the biochar A content was 10% or higher, namely when the mixing ratio between the biochar A and the cement fell within the range from 10:90 to 100:0.

In Example 1, with the relation with the strength described previously also taken into consideration, the grounding resistance reducing material 14 was produced by mixing the carbide granules and the cement uniformly at the mixing ratio of 45:55.

The biochar A is carbide granules obtained from the residue after producing a synthetic gas by degrading woodchips by heat, its volumetric specific gravity was 0.15 g/cm$^3$, and the mass fraction of moisture in the carbide granules fell on the range from 5.20 to 7.47% by weight.

The specific resistance of the carbide granules was 12 Ω·cm. The specific resistance was measured in a state where the carbide granules were made to absorb water by kneading them with water. 30 g of carbide granules was put in a test vessel and kneaded uniformly by adding water to make them absorb as much water as possible while making sure that water did not leak up even when mixed. The specific resistance was measured by the four-electrodes method.

Meanwhile, the cement used was blast furnace cement type B (Portland cement: 40% to 70%, blast furnace slag: 30% to 40%).

The grounding resistance reducing material 14 produced by uniformly mixing the biochar A and the cement was placed in multiple bags. The capacity of a bag was 24,000 cm$^3$, and its weight was 13 kg.

(Fabricating a Grounding Device)

As shown in FIG. 1 and FIG. 2, soil 12 was excavated to produce a groove-like concave portion 13 having a width of 0.5 m, a depth of 0.7 m, and a length of 2.6 m. As the grounding electrode 11 connected to a coated wire 15, a 2.6 m-long bare copper twisted wire was laid along the groove-like concave portion 13. A bag of grounding resistance reducing material 14 in a state of granules was placed on the bare copper twisted wire laid as the grounding electrode 11.

The groove was then backfilled so that the thickness of the soil became 10 cm, treaded, and thus the groove-like concave portion 13 was backfilled completely.

(Measuring the Grounding Resistance)

Figure 8:
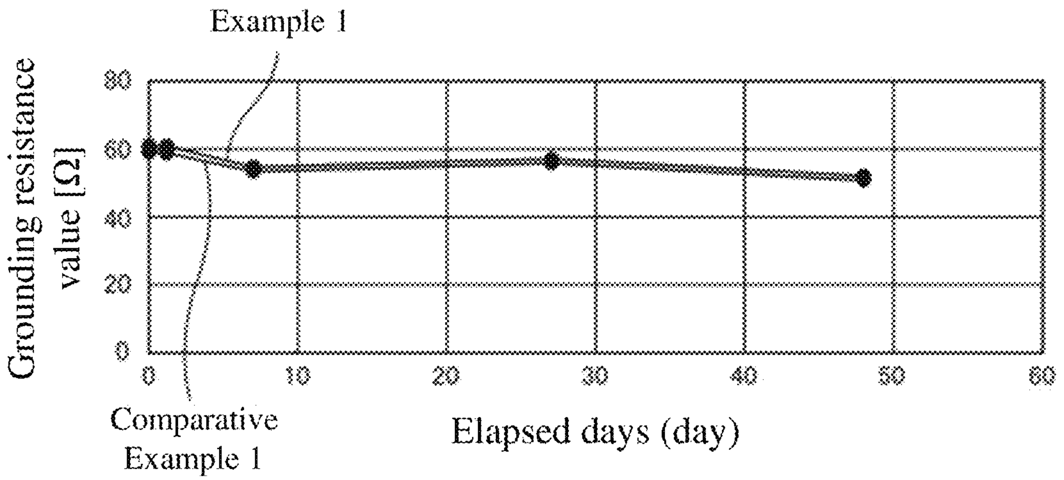
FIG. 8 is a chart showing the measurement result of change over time of grounding resistance in Example 1 and Comparative Example 1.

After fabricating the grounding device, the grounding resistance value was measured over time. The measurement results are shown in Table 1 and FIG. 8. The grounding resistance value was measured using a direct-reading grounding resistance meter (Model FT6031 by Hioki E.E. Corporation).

Comparative Example 1

The grounding device 10 was fabricated in the same manner as the Example 1 except that a grounding resistance reducing material using coal coke powder (SAN-EARTH M5C (registered trademark) by Sankosha Corporation) was used, and the grounding resistance value was measured over time. Measurement results are shown in Table 1 and FIG. 8.

The bulk specific gravity of the coal coke constituting the grounding resistance reducing material, SAN-EARTH M5C, was 0.72 g/cm$^3$, and the mass fraction of the moisture contained in the carbide granules was 0.5% by weight. The specific resistance of the carbide granules in the state kneaded with water was 430 Ω·cm. The same cement as the one used in Example 1 was used.

The grounding resistance reducing material, SAN-EARTH M5C, is a mixture of coal coke powder and cement mixed at the ratio of 45:55.

The grounding resistance reducing material, SAN-EARTH M5C, was in a state placed in bags. The capacity of a bag was the same as that in Example 1, and its weight was 25 kg.

TABLE 1

| Elapsed days | Grounding resistance value (Ω) | |
|---|---|---|
| | Example 1 | Comparative Example 1 |
| 0 | 61 | 59 |
| 1 | 61 | 59 |
| 7 | 55 | 54 |
| 27 | 57.6 | 56.1 |
| 48 | 53.3 | 51.9 |

Example 2

The grounding resistance value was measured in the same manner as Example 1 except that the grounding resistance reducing material 14 kneaded with water in advance to become in a state of slurry was used and that the grounding device 10 as shown in FIG. 4 was fabricated.

The grounding device 10 was made by excavating the soil to fabricate a 100 mm ¢ and 3 m-deep groove-like concave portion 13, inserting a 2.6 m-long bare copper twisted wire into the concave portion 13 as the grounding electrode 11, filling the concave portion 13 in a state of vertical hole with a bag of grounding resistance reducing material 14 that was made to be in a state of slurry by kneading with 25 kg of water, and backfilling the concave portion with the soil completely.

Figure 9:
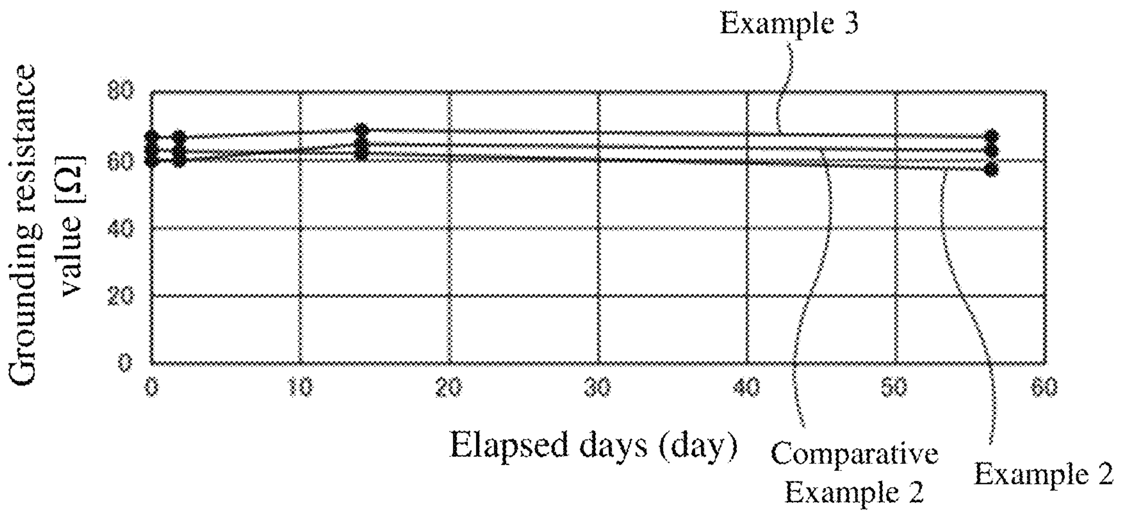
FIG. 9 is a chart showing the measurement result of change over time of grounding resistance in Examples 2 and 3 and Comparative Example 2.

After the grounding device 10 was created, the grounding resistance value was measured over time. The measurement results are shown in Table 2 and FIG. 9. The grounding resistance value was measured by using the above-mentioned direct-reading grounding resistance meter.

Example 3

The grounding resistance reducing material 14 was produced and the grounding device 10 was fabricated in the same manner as Example 2 except that biochar B (derived from woodchips of cedar, cypress, etc.) was used, and the grounding resistance value was measured over time. The measurement results are shown in Table 2 and FIG. 9.

The biochar B constituting the carbide granules is granules of carbide obtained from the residue after producing a synthetic gas by degrading woodchips by heat. Its bulk specific gravity was 0.17 g/cm$^3$, and the mass fraction of the moisture contained in the carbide granules was 13.08%. Also, the specific resistance of the carbide granules in kneaded state was 99 Ω·cm. The same cement as that used in Example 2 was used.

The grounding resistance reducing material 14 produced by mixing the biochar B and the cement uniformly was bagged in multiple bags. The capacity of a bag was the same as Example 1, and its weight was 10 kg.

To turn this grounding resistance reducing material 14 into a slurry suitable for use, it was necessary to add 20 kg of water to each bag of 10 kg of grounding resistance reducing material 14.

Comparative Example 2

The grounding device 10 was in the same manner as Example 2 except that SAN-EARTH M5C (registered trademark) by Sankosha Corporation was used as the grounding resistance reducing material as in the case of Comparative Example 1, where coal coke powder was used, and the grounding resistance value was measured over time. The measurement results are shown in Table 2 and FIG. 9.

To turn this grounding resistance reducing material into a slurry suitable for use, it was necessary to add 20 kg of water to each bag of 25 kg of grounding resistance reducing material 14.

TABLE 2

| Elapsed days | Grounding resistance value (Ω) | | |
|---|---|---|---|
| | Example 2 | Example 3 | Comparative Example 2 |
| 0 | 64 | 67 | 60 |
| 1 | 63 | 67 | 60 |
| 7 | 62.7 | 69.7 | 65 |
| 28 | 57.7 | 67.5 | 63.6 |

As apparent from the above results, the weight of the grounding resistance reducing material 14 using biochar A or biochar B was trimmed while keeping the same volume as the grounding resistance reducing material using coal coke.

It was found that when the grounding electrode 11 was buried in the soil 12 by using the grounding resistance reducing material containing biochar A or biochar B of the same volume as the grounding resistance reducing material containing coal coke, the grounding resistance value of the same level as that of the grounding resistance reducing material containing coal coke was achieved.

It was thus confirmed that the grounding resistance reducing material 14 in Examples can be used in the same manner as the grounding resistance reducing material using coke of fossil fuel in Comparative Examples.

REFERENCE SIGNS LIST

10 Grounding device
11 Grounding electrode
12, 12' Ground
13 Concave portion
14 Grounding resistance reducing material
15 Coated wire
16 Connection fitting

What is claimed is:

1. A grounding resistance reducing material to be laid between a grounding electrode buried in soil and the soil, consisting of carbide granules obtained from incomplete combustion of woody biomass, wherein
the specific resistance of the carbide granules is 430 Ω·cm or lower,
the carbide granules and a hydraulic powder are mixed at a ratio by weight in a range from 10:90 to 50:50,
the carbide granules and the hydraulic powder are contained in a mixed state, and
the grounding electrode can be integrated as hardening progresses.

2. The grounding resistance reducing material as set forth in claim 1, wherein the bulk specific gravity of the carbide granules is 0.40 g/cm$^3$ or lower.

3. The grounding resistance reducing material as set forth in claim 2, wherein the mass fraction of moisture contained in the carbide granules is 7.5% by weight or lower.

4. A grounding device characterized in that a grounding resistance reducing material as set forth in claim 1 is buried and hardened in soil and that a grounding electrode is integrated into the grounding resistance reducing material.

5. A grounding device characterized in that a grounding resistance reducing material as set forth in claim 2 is buried and hardened in soil and that a grounding electrode is integrated into the grounding resistance reducing material.

6. A grounding resistance reducing material to be laid between a grounding electrode buried in soil and the soil, consisting of carbide granules obtained from incomplete combustion of woody biomass and a hydraulic powder, wherein the specific resistance of the carbide granules is 430 Ω·cm or lower, the bulk specific gravity of the carbide granules is 0.40 g/cm$^3$ or lower, the carbide granules and the hydraulic powder are mixed at a ratio by weight in a range from 10:90 to 50:50, the carbide granules and the hydraulic powder are contained in a mixed state, and the grounding electrode can be integrated as hardening progresses.

7. The grounding resistance reducing material as set forth in claim 6, wherein the mass fraction of moisture contained in the carbide granules is 7.5% by weight or lower.

8. A grounding device characterized in that a grounding resistance reducing material as set forth in claim 6 is buried and hardened in soil and that a grounding electrode is integrated into the grounding resistance reducing material.

9. A grounding device characterized in that a grounding resistance reducing material as set forth in claim 7 is buried and hardened in soil and that a grounding electrode is integrated into the grounding resistance reducing material.

* * * * *